Aug. 3, 1965 J. H. BECKMAN ETAL 3,198,390
INSULATED CONTAINER HAVING A DISPOSABLE BAG THEREIN
ANCHORED TO ITS DISCHARGE TUBE
Filed April 30, 1962 3 Sheets-Sheet 3

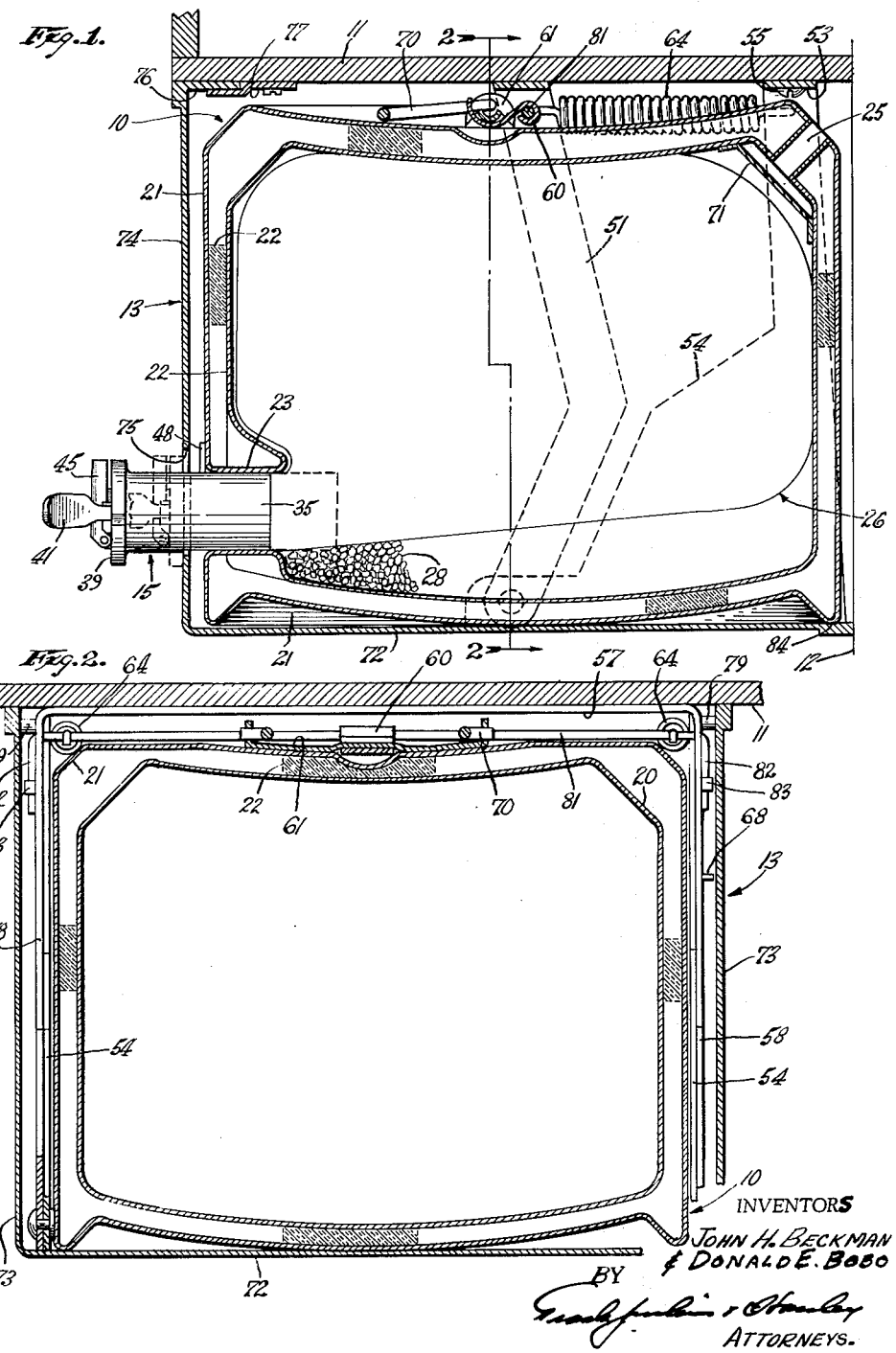

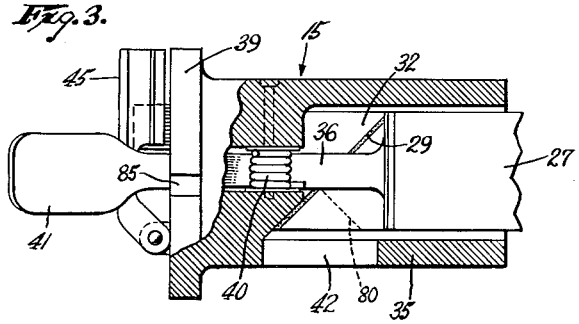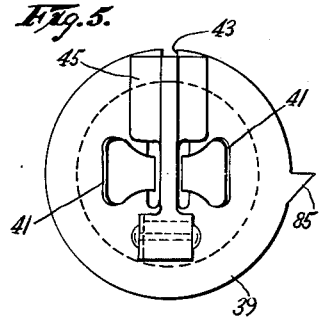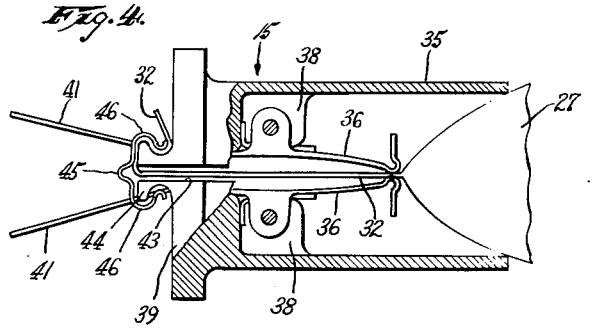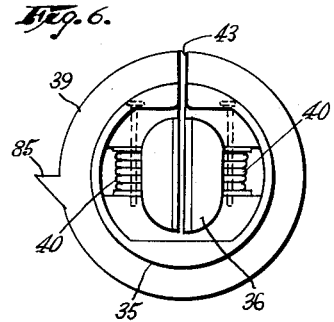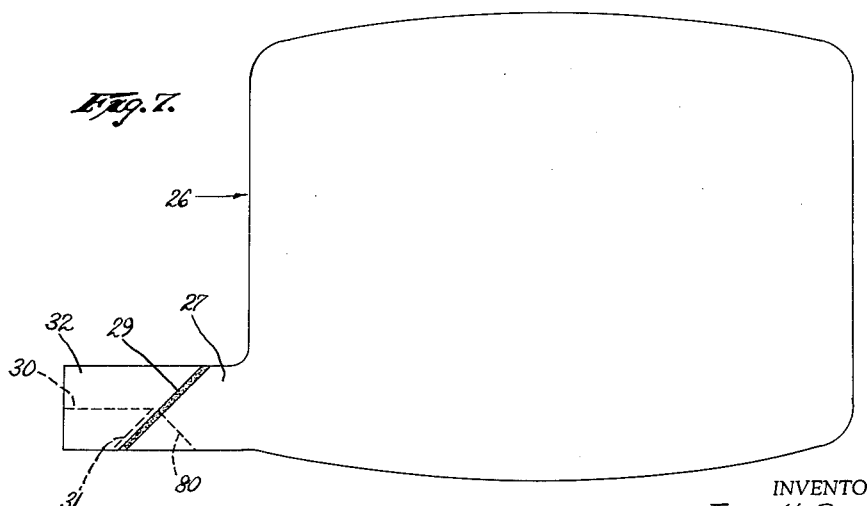

INVENTORS
JOHN H. BECKMAN
BY DONALD E. BOBO

ATTORNEYS.

3,198,390
INSULATED CONTAINER HAVING A DISPOSABLE
BAG THEREIN ANCHORED TO ITS DISCHARGE
TUBE
John H. Beckman, 5117 McCray, and Donald E. Bobo,
1604 N. Lynhurst, both of Indianapolis 24, Ind.
Filed Apr. 30, 1962, Ser. No. 191,214
9 Claims. (Cl. 222—105)

This invention relates to a refrigerated liquid container, and more particularly to a container in which milk can be safely stored in the home over a period of a week or more. The cost of delivering milk to homes is a factor in the cost of the milk to the consumer; and as the average home lacks facilities for maintaining more than a limited quantity of milk under refrigeration, frequent deliveries are necessary, with the result that delivery costs are substantial. Those costs could be reduced by delivering the milk in larger quantities at less frequent intervals, but the adoption of such a practice is hampered by lack of adequate refrigerated storage space in the average home and by the size, weight, cost and unwieldy character of a self-refrigerated container of adequate capacity. It is the basic object of this invention to overcome those difficulties and to make practicable the home delivery of milk, in quantities as large as two gallons or more, in a self-refrigerated container from which the milk can be conveniently withdrawn as desired.

A preferred form of container in accordance with the invention comprises inner and outer shells the space between which contains an appropriate heat-insulating material and is desirably evacuated. Near the bottom of the container, the two shells are interconnected by a tube through which the interior of the inner shell is accessible. The milk or other liquid to be stored is contained in a disposable plastic bag received in and supported by the inner shell. Such bag is provided at its bottom with a neck which projects horizontally into the aforesaid tube where it is received within a sleeve slidably supported in the tube. Mounted in the sleeve is a neck-clamping valve operable from the exterior of the sleeve to control withdrawal of milk through aligned openings in the neck and the bottom of the sleeve. Slidability of the sleeve in the tube allows the neck to be positioned normally within the insulated interior of the container while permitting the sleeve to be slid outwardly to expose the aforesaid openings when it is desired to withdraw milk.

We contemplate that the valve-containing sleeve above referred to will form part of the equipment retained by the milk-user and that the dairy or milk distributor will deliver only the filled container while picking up and returning an emptied container. At the dairy, the bag is removed from the returned container and discarded, a new bag is inserted into the inner shell, and the bag filled with cold milk, after which the bag-neck is sealed. To aid in maintaining the milk cold, a quantity of crushed ice may be placed in the inner shell before the bag is inserted. Upon receiving the filled container, the user inserts the valve-containing sleeve into the container tube, applying the neck-clamping valve while doing so. The lower corner of the neck, which is accessible through the opening in the bottom of the sleeve, is then clipped off, as with scissors, to permit milk to be withdrawn upon release of the valve.

It is desirable to provide for a container as above described a support which will support the container above a shelf or counter that might otherwise interfere with the positioning of the receptacle which is to receive the withdrawn milk. A preferred form of support comprises a base adapted to be mounted on a wall or cabinet bottom, desirably over a counter or like supporting surface. Pivotally connected on a horizontal axis to the lower portion of the base is a yoke urged toward an upright position by one or more springs and provided near its free end with means engageable with the container. By swinging the yoke forwardly and downwardly it may be brought into a position in which it may be engaged with the container supported on the counter, after which, with the assistance of the springs, the yoke may be swung upwardly and rearwardly to carry the container into a storage position in which the opening through which milk is to be withdrawn will be well above the counter. If desired, the support may be so constructed that at least part of the weight of the container and its contents is carried through an elastically yieldable element which will cause the container to move upwardly as it is emptied and its weight thereby reduced, thus enabling the vertical position of the container to be employed as an indication of the quantity of milk remaining.

Further objects and features of the invention will become apparent from the following more detailed description and from the accompanying drawings, in which:

FIG. 1 is a vertical section through the container and its mounting;

FIG. 2 is a transverse vertical section on the line 2—2 of FIG. 1;

FIG. 3 is a side elevation, in partial section of the valve mechanism;

FIG. 4 is a plan view, in partial section, of the valve mechanism;

FIG. 5 is an end elevation of the outer end of the valve mechanism;

FIG. 6 is an end elevation of the inner end of the valve mechanism;

FIG. 7 is a side elevation of the milk-containing bag;

Figure 8:
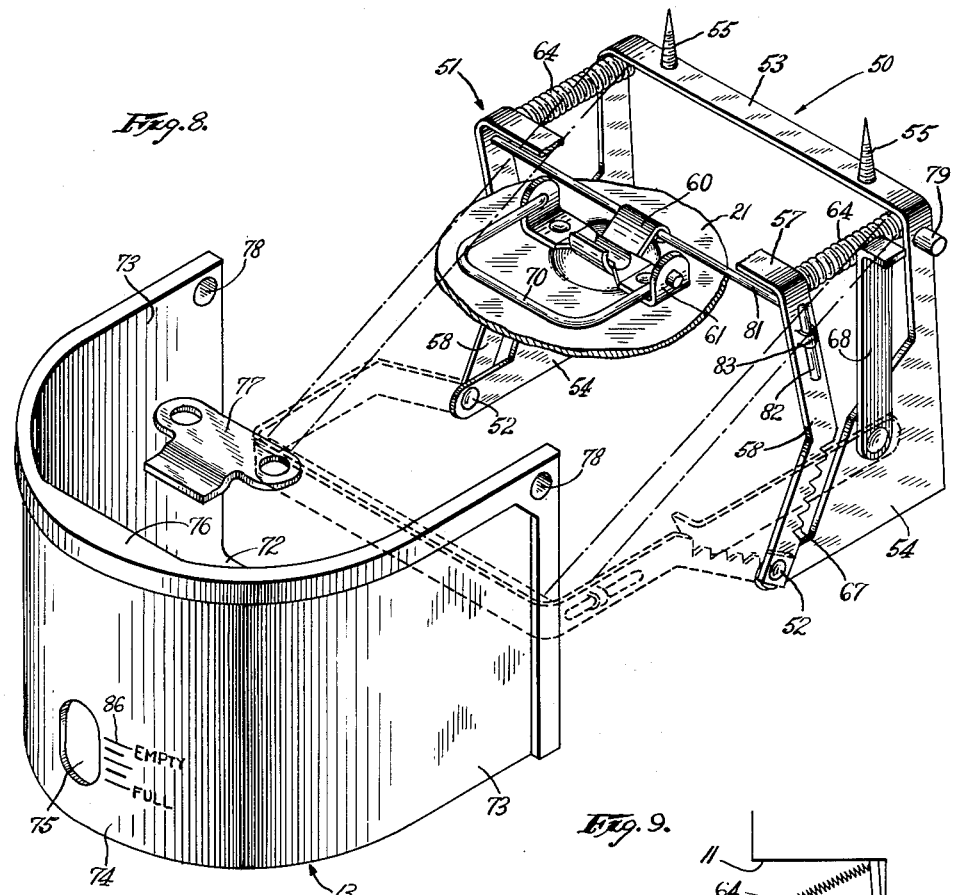
FIG. 8 is an isometric view of the container mounting with the cover shown in removed position.

Referring to FIG. 1 of the drawing, it will be seen that the device as illustrated comprises a milk container designated in its entirety by the reference numeral 10 supported in the angle between a cabinet bottom 11 and a wall 12. When in the position shown in FIG. 1, the container is enclosed within a removable cover 13 supported in any convenient manner. The device includes valving mechanism, designated in its entirety by the reference numeral 15, which extends through the front wall of the cover 13 and which may be operated to control withdrawal of milk from the container.

As previously indicated, the container 10 is refrigerated and insulated. For the latter purpose, the container is shown as comprising spaced inner and outer shells 20 and 21, the space between which is filled with some appropriate form of thermo insulation 22, such as glass fibers and aluminum foil. Further to insulate the inner shell, the space between the two shells is desirably evacuated. Near the bottom of the container and at the front thereof, the two shells, which are desirably circular in plan, are rigidly interconnected by a tube 23 which slidably receives the valve mechanism 15. Additional structural interconnection of the two shells is provided by a vent tube 25 conveniently located at the upper portion of the container near the rear thereof. To retard ingress of heat, the tubes 23 and 25 are preferably thin-walled and made of material of low heat conductivity. Obviously, the tubes should have adequate strength to sustain the stresses imposed upon them by the weight of the inner shell and its contents. Further, the material of which the tubes are formed should be impervious to air in order that the vacuum between the shells will not be destroyed. Conveniently, the tubes are formed of low-conductivity plastic and, if necessary to impermeability, provided with thin metal liners.

Within the inner shell 20 is a bag 26 which contains the milk. Such bag, which is perhaps best illustrated in FIG. 7, is formed of a suitable pliable material, such as polyethylene, and has a size and shape roughly conforming to the interior of the inner shell 20. Near its bottom, the bag 26 has an outwardly projecting neck 27 adapted to be received in the valve mechanism 15 in a manner to be described in detail hereinafter.

The bag 26 is disposable, a new bag being used each time the container is to be filled with milk. If necessary to maintain the milk at a suitable temperature during storage, a supply of crushed ice 28 may be placed in the inner shell 20 before the bag 26 is inserted therein and the bag, in folded condition, is then inserted into the inner container through the tube 23. Following its insertion, the bag is filled with a measured quantity of milk and the neck is then sealed, preferably with a heat seal, along the oblique line 29 shown in FIG. 7. Following the filling of the bag and sealing of the neck, the latter is cut along the dotted lines 30 and 31 of FIG. 7 to leave at the top portion of the neck a tab 32 projecting forwardly from the seal 29.

The valve mechanism which is used to control withdrawal of milk is illustrated in detail in FIGS. 3–6. Such mechanism comprises a sleeve 35 open at its inner end to receive the neck 27 and with such a diameter as to be freely slidable within the tube 23 connecting the inner and outer shells of the container 10. Within the sleeve 35 is mounted a pair of fingers 36 spring-pressed toward each other to receive and clamp the bag-neck 27 between them. As shown, the fingers are pivotally mounted on bosses 38 within the sleeve and project outwardly through an opening in the outer end wall 39 with which the sleeve 35 is provided. Springs 40 associated with the fingers 36 at their pivotal mountings within the sleeve 35 urge the inner ends of the fingers toward each other to clamp the bag-neck 27 between them. The outer ends 41 of the fingers are normally separated, as indicated in FIG. 4, so that by pressing them together the inner ends of the fingers will be moved apart to release the bag-neck 27.

At a point outwardly from the inner, or neck-clamping, ends of the fingers 36 the bottom wall of the sleeve 35 is provided with an outlet opening 42. Such opening and the inner ends of the fingers 36 are so disposed longitudinally of the sleeve 35 that when such sleeve is in its innermost position, as indicated in dotted lines in FIG. 1, the opening and the milk-filled portion of the bag-neck 27 will be disposed within the refrigerated interior of the container 10. By withdrawing the sleeve to the full-line position shown in FIG. 1, the opening 42 may be disposed externally of the cover 13 to permit the withdrawal of milk.

It is desirable to equip the sleeve 35 with means for anchoring the bag-neck 27 to it, and it is for that purpose that the tab 32 previously referred to is provided. The upper portion of the sleeve is provided with a slot 43 which extends through the annular sleeve-wall and also through both the front sleeve-wall 39 and a boss 44 provided on the exterior face of such front sleeve-wall. Pivotally mounted on the front face of the sleeve-wall 39 is a clip 45 having resilient sides 46 adapted to receive between them and to grip the boss 44. As will be clear from FIG. 4, the tab 32 on the bag-neck 27 extends outwardly through the front sleeve-wall 39 and the boss 44, its end being folded rearwardly along one side of the boss to be gripped between the boss and the adjacent clip-side 46 when the clip is in operative position. To insure against accidental displacement of the clip and consequent release of the tab 32, the sides of the boss 44 may be made re-entrant and the clip-sides 46 shaped to enter such re-entrant sides.

In order to maintain the sleeve 35 properly oriented about its axis with the opening 42 at its bottom, the front wall of the outer container-shell 21 may be provided with a finger 48 (FIG. 1) slidably received in the slot 43 of the sleeve.

Figure 9:
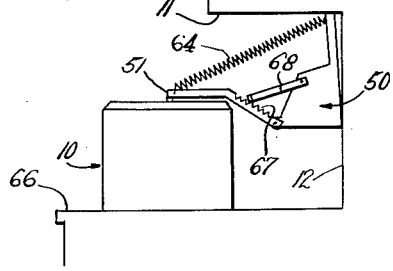
FIG. 9 is a side elevation illustrating the container mounting extended, or in position to receive a filled container.
Figure 10:
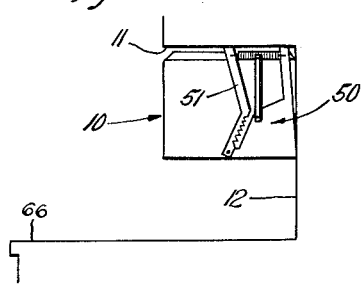
FIG. 10 is a side elevation illustrating the container-mounting in retracted position with the container disposed in its storage position.

As has been previously indicated, it is desirable to provide for the filled container 10 a support by which the container may be positioned above a counter, shelf, or like surface. A preferred form of support is illustrated in FIGS. 8–10, from which it will be apparent that the support comprises a base 50 to the lower portion of which a yoke 51 is pivotally attached on a horizontal axis as by means of rivets 52. Conveniently, the base 50 is formed of sheet metal bent to provide a horizontal intermediate portion 53 from which side portions 54 extend downwardly. The intermediate portion 53 is shown as being provided with holes for the reception of screws 55 by means of which the base may be secured to the lower side of a shelf or cabinet-bottom 11 as shown in FIG. 1, with the rear edges of the sides 54 resting against the wall 12.

The yoke 51, like the base 50, may be formed of sheet metal bent to provide an intermediate portion 57 from which yoke-sides 58 extend downwardly to their point of pivotal connection with the base-sides 54 at the rivets 52. Carried by the yoke 51 is a hook 60 adapted for engagement with a metal strap 61 secured, as by welding, to the upper wall of the outer container-shell 21. Tension springs 64 acting between the upper portion of the base 50 and the yoke 51 urge the latter into a position in which the yokesides 58 are generally vertical.

The manner in which a container 10 may be connected to the support and held in elevated position thereby is illustrated in FIGS. 9 and 10. As shown in FIG. 9, the container 10 is placed on the counter or shelf-top 66 above which the base 50 is mounted, and the yoke 51 is swung forwardly and downwardly from its normal, generally upright position, thus extending the springs 64. If desired, one of the yoke sides may be provided with a series of teeth 67 adapted to be engaged by a latch 68 pivotally mounted on the base 50 in a position such that it can be swung forwardly and downwardly into engagement with one of the teeth 67 to hold the yoke 51 in depressed position while the hook 60 thereon is being engaged beneath the strap 61 on the container. After such engagement is effected, the latch 68 is released and the yoke swung into the upright position shown in FIG. 10 and in full lines in FIG. 8. As will be apparent, the springs 64 assist in retraction of the yoke and facilitate raising of the container 10 into its elevated storage position. To facilitate handling of the container 10 when not associated with its support, it may be provided with a handle or bale 70 pivotally mounted in the up-bent ends 61' of the strap 61.

After the container 10 is positioned as indicated in FIG. 10, the cover 13 may be applied. Such cover, which is conveniently a plastic molding, is best illustrated in FIGS. 1, 2, and 8, from which it will be apparent that the cover has a bottom wall 72 and side walls 73 merging with a curved front wall 74, the latter having an opening 75 through which the sleeve 35 is adapted to pass. To support the cover, it may be provided at its front with a web 76, adapted to be received in a clip 77 secured to the lower surface of the shelf or cabinet-bottom 11, and at the upper rear corners of the side walls 73 with openings 78, adapted to receive bosses 79 projecting outwardly from the sides 54 of the base 50. The sides 73 of the cover are sufficiently flexible to permit them to be sprung apart to effect engagement and disengagement of the holes 78 with the bosses 79.

If desired, the container support may include an elastically deformable element through which at least part of the weight of the container and its contents is carried, thereby making it possible for the height of the container to serve as an indication of the quantity of milk remaining within it. To that end the hook 60 of the device shown in the drawings may be secured to a rod 81 which extends across the yoke 51 beneath the intermediate portion 57 thereof and has its ends rigidly connected to the yoke-sides 58. As shown, the rod extends through holes in the yoke-sides and has projecting ends 82 which are bent to extend along the yoke sides to which they are secured by struck-out tongues 83 bent over them. Preferably only a part of the weight of the container and its contents is carried by the hook 60, the remainder being carried by engagement of the rear of the container with the bottom wall 72 of the cover 13, as indicated at 84 in FIG. 1. The weight carried by the hook 60 stresses the rod 81 in torsion, as well as in flexure in the particular construction shown, and the rod may be so designed as to yield appreciably under such stress, with the result that as the container is emptied and the load on the rod thereby reduced, the container will swing upwardly about the point 84. To accommodate such movement, the opening 75 in the front of the cover is vertically elongated; and, to provide an indication as to the position of the container, the sleeve 35 may be equipped with a pointer 85 disposed to pass over a series of vertically spaced graduations 86 displayed on the front of the cover 13.

As previously indicated, it is contemplated that filled containers will be distributed to homes while empty containers are picked up and returned to the dairy or a milk-distributing station, where the bags 26 will be removed from the containers and discarded. When the container is to be refilled, crushed ice may be placed therein as indicated at 28 and the bag 26, in folded or otherwise collapsed condition, is inserted into the inner shell 20 through the tube 23, leaving the bag-neck 27 projecting from the tube. The bag is then filled with milk and the neck 27 sealed as indicated at 29 in FIG. 7. Filling of the bag involves the expulsion of air from the interior of the inner shell 20, such air escaping through the vent tube 25. To prevent the bag-wall from being forced into the vent tube, the inner shell may be provided with a metal strip 71 overlying but spaced slightly from the inner end of the vent tube 25 in such position that it will prevent the bag from entering the tube while, at the same time, permitting egress of air through the tube. With the bag 26 filled and the neck 27 sealed, the neck is cut along the lines 30 and 31 to leave the tab 32, and the container is then ready for delivery.

When the user desires to mount a filled container in its support, the cover 13, if in position, is removed and the yoke 51 swung forwardly to permit engagement of the hook 60 with the strap 61 of the container, and the container is then moved into its storage position as above described, following which the cover 13 may be applied. The hole 75 at the front of the cover leaves the interior of the tube accessible so that it is possible to withdraw the tab 32 into a position such that it extends through the opening 75. With the tab held in one hand, and with the clip 45 swung into its inoperative position, the user grips the projecting ends 41 of the valve fingers with the other hand, forces them together, and inserts the sleeve 35 through the opening 75 into the tube 23. During this operation, the tab 32 is guided into the slot 43. With the sleeve moved inwardly far enough to permit the inner ends of the fingers 36 to clamp the bag-neck 27 in rear of the seal 29, the projecting finger-ends 41 are released to permit the inner ends of the fingers to clamp the bag-neck between them, the outer end of the tab 32 is folded over one side of the boss 44, and the clip 45 is forced into the position shown in FIGS. 3 and 4, where it grips the end of the tab 32 and securely anchors it to the sleeve. With the sleeve positioned so that the opening 42 is located exteriorly of the cover, the forward end of the bag-neck, which is accessible through the opening 42, is clipped off, as with scissors, approximately along the dotted line 80 shown in FIGS. 3 and 7. Since the fingers 36 are at this time released and clamping the bag-neck between them, no appreciable quantity of milk will escape when the tip of the bag-neck is removed.

Following removal of the tip of the bag-neck, the sleeve 35 is pushed inwardly to bring it into the dotted-line position shown in FIG. 1. In this position, the milk-filled bag neck inwardly from the inner ends of the fingers 36 will be disposed within the refrigerated interior of the container 10, and the milk therein will therefore not be subject to spoilage. When it is desired to withdraw milk, the sleeve 35 is pulled outwardly until the opening 42 clears the front wall 74 of the cover 13, whereupon forcing together of the finger-ends 41 will release the bag-neck and permit milk to flow therefrom and out through the opening 42 under the influence of gravity. Desirably, the opening 42 is large enough that the emerging milk stream may pass through it without coming in contact with its sides.

We have referred above to the desirability of forming the shell-connecting tubes 23 and 25 of a plastic, for low heat conductivity, and of providing them with metal liners to prevent seepage through the tube-walls of air which would destroy the vacuum between the inner and outer shells. Such metal-lined tubes, especially if the liner is of stainless steel or other appropriate metal, have additional advantages in that the liners provide interior surfaces which may be readily and effectively cleaned and prevent contact of the milk, or cleaning liquids, with the plastic, thus reducing or eliminating possible deterioration of the plastic and absorption by the plastic of liquids which might create objectionable odors or impart an undesirable taste to the milk.

While the invention has, for convenience, been described with reference to its use in the distribution and storage of milk, it is to be understood that its use is not limited to the handling of that particular liquid. However, the specific form of the invention has many features which adapt it especially for use in the dairy industry where sanitation and the preservation of suitably low temperatures are of importance. The use of the disposable bags makes it unnecessary to sterilize the containers before each use. The retractable valve mechanism makes it possible to maintain all the milk and all milk-contacted surfaces adequately chilled while still permitting the ready withdrawal of milk when desired. The container may be large enough to reduce materially the necessary frequency of deliveries, thus reducing costs, while at the same time the container may be easily handled and mounted in storage position by the housewife.

We claim as our invention:

1. In combination with a liquid container having walls of low thermal conductivity and, in one of said walls near the bottom thereof, an opening providing communication between the interior and exterior of the container, a liquid containing bag of pliable material located within said container, said bag having a neck located in said opening and long enough to project therethrough, a sleeve in said opening and surrounding said neck, said sleeve having an outlet opening in its bottom wall and said neck having a discharge orifice located over said outlet opening, neck clamping valve means mounted within said sleeve, operable from exteriorly thereof, and adapted to clamp said neck at a point spaced inwardly from the outer end of said outlet opening, said sleeve being slidable in said first mentioned opening between an outer position in which said outlet opening is located exteriorly of said container and an inner position in which the neck-clamping portion of said valve means is spaced inwardly from the outer end of said first mentioned opening.

2. The combination of claim 1 wherein said container comprises inner and outer shells the space between which contains heat insulation, said first mentioned opening being the interior of a tube extending between and secured to walls of the inner and outer shells.

3. The combination of claim 2 wherein the space between said shells is evacuated.

4. The combination of claim 1 with the addition of means in addition to said valve means for connecting said neck to said sleeve to cause the neck to move with the sleeve when the latter is moved to its outer position.

5. In combination with a liquid container having walls of low thermal conductivity and, in one of said walls near the bottom thereof, an opening extending from the exterior to the interior of the container and having a substantial longitudinal extent, a liquid containing bag of pliable material located within said container, said bag having a neck located in said opening and having a discharge orifice at its outer end, and valve means associated with said neck closely adjacent said orifice for controlling the discharge of liquid therefrom, said valve means and the adjacent portion of said neck being slidable longitudinally of said opening into and out of a position in which the valve means is disposed within the longitudinal extent of said opening.

6. In combination with a liquid container having walls of low thermal conductivity and, in one of said walls near the bottom thereof, an opening providing communication between the interior and exterior of the container, a liquid containing bag of pliable material located within said container, said bag having a neck located in said opening and having a discharge orifice at its outer end, and valve means associated with said neck closely adjacent said orifice for controlling the discharge of liquid therefrom, said container being provided with a vent opening extending through a container wall near the top of the container, and a support extending across said opening in non-occluding relation for preventing the bag from entering the opening.

7. The combination of claim 6 with the addition that said container comprises inner and outer shells, said openings being the interiors of rigid tubes each of which is secured at its ends to said shells and at least in part supports the inner shell.

8. The invention of claim 1 with the addition of means for supporting said container, said supporting means including an elastically yieldable element through which at least a part of the weight of the container and its contents is carried, a cover enclosing said container and rigid with said supporting means, said cover having a wall provided with an opening through which said sleeve projects and in which the sleeve is vertically movable, said cover wall being provided at one side of said opening with a series of vertically spaced graduations, said sleeve having a pointer cooperating with said series of graduations to indicate the vertical position of the container relative to the cover and support.

9. In combination, spaced inner and outer rigid shells, the space between which is evacuated to provide heat insulation, a tube extending between said shells in the bottom part thereof and at least in part supporting the inner shell, said tube being of relatively small diameter to limit heat loss from the inner shell and providing access through its interior to the inner shell, a bag located within said container and adapted to contain a liquid, said bag being formed of flexible material capable of being inserted in collapsed condition into the inner shell through said tube, said bag being provided at said tube with a projecting neck, and valve means engaged with said neck and having shutoff means for controlling flow from the bag, said valve means being removably received in the tube and movable therein to a normal position in which shutoff means is disposed inwardly of the outer end of the tube and, when closed, cuts off flow at, and contains the liquid inwardly of, a point adjacent the inner end of the tube.

References Cited by the Examiner
UNITED STATES PATENTS

| 876,159 | 1/08 | Erickson | 312—248 |
| 2,163,057 | 6/39 | Payson et al. | 62—400 X |
| 2,206,984 | 7/40 | Vogt | 222—107 X |
| 2,344,556 | 3/44 | Marley | 222—181 |
| 2,432,968 | 12/47 | Lahey | 222—107 X |
| 2,446,308 | 8/48 | Smith | 222—107 X |
| 2,504,916 | 4/50 | Zolot | 62—400 X |
| 2,559,877 | 7/51 | Ihle et al. | 222—131 |
| 2,564,163 | 8/51 | Leperre. | |
| 2,750,870 | 6/56 | Colonna | 222—131 X |
| 2,828,903 | 4/58 | Adkins | 220—9 X |
| 2,841,311 | 7/58 | Parizek | 222—181 |
| 2,861,718 | 11/58 | Winzen | 222—105 |
| 2,973,119 | 2/61 | Parker | 222—131 |
| 3,007,608 | 11/61 | Cox | 222—105 |

FOREIGN PATENTS 1,033,076  4/53  France.

RAPHAEL M. LUPO, *Primary Examiner.*

LOUIS J. DEMBO, *Examiner.*